United States Patent [19]

Graham

[11] 4,439,666

[45] Mar. 27, 1984

[54] ELECTRICAL HEATING SYSTEM

[75] Inventor: Charles H. Graham, Salt Lake City, Utah

[73] Assignee: Intermountain Thermafloor, Salt Lake City, Utah

[21] Appl. No.: 309,550

[22] Filed: Oct. 7, 1981

[51] Int. Cl.³ ............................................. H05B 1/00
[52] U.S. Cl. .................................. 219/213; 219/358; 219/488; 219/494; 219/495; 219/545; 219/489; 338/208; 338/281
[58] Field of Search ............... 219/211, 212, 213, 217, 219/218, 345, 358, 527, 482, 528, 529, 530, 535, 545, 548, 549, 552, 553, 489, 488, 494, 503, 495; 338/208, 209, 210, 212, 279, 281; 307/135; 432/1

[56] References Cited

U.S. PATENT DOCUMENTS

| | | | |
|---|---|---|---|
| 1,175,433 | 3/1916 | Goetsch | 338/281 X |
| 1,226,627 | 5/1917 | Barnum | 338/281 |
| 1,928,142 | 9/1933 | Trent et al. | 338/281 X |
| 2,511,540 | 6/1950 | Osterheld | 338/279 X |
| 2,533,409 | 12/1950 | Tice | 219/213 |
| 2,884,509 | 4/1959 | Heath | 219/545 X |
| 2,938,103 | 5/1960 | Crump | 219/545 X |
| 2,938,992 | 5/1960 | Crump | 219/545 X |
| 3,143,640 | 8/1964 | Becker | 219/494 |
| 3,214,565 | 10/1965 | Hager et al. | 219/345 |
| 3,233,078 | 2/1966 | Siemianowski | 219/213 |
| 3,233,097 | 2/1966 | Watkins | 219/213 X |
| 3,255,337 | 6/1966 | Willat et al. | 219/528 |
| 3,413,439 | 11/1968 | Eisler | 219/213 |
| 3,539,767 | 11/1970 | Eisler | 219/213 |
| 3,539,768 | 11/1970 | Eisler | 219/213 |
| 3,546,432 | 12/1970 | Eisler | 219/345 |
| 3,584,198 | 6/1971 | Doi et al. | 219/549 |
| 3,637,975 | 1/1975 | Eilhardt et al. | 219/213 |
| 3,721,800 | 3/1973 | Eisler | 219/213 |
| 3,760,147 | 9/1973 | Tyrey | 219/217 |
| 4,363,947 | 12/1982 | Bergersen | 219/528 |

FOREIGN PATENT DOCUMENTS 113192  5/1941  Australia ............................ 219/213

Primary Examiner—Volodymyr Y. Mayewsky
Attorney, Agent, or Firm—H. Ross Workman; Rick D. Nydegger; Berne S. Broadbent

[57] ABSTRACT

An electrical heating system for use in heating surfaces. A heating element is constructed of mesh screen comprised of nonferrous, small gauge metal wires which are spaced in a cloth mesh arrangement such that the total surface area of the wires is substantially equal to or greater than the adjacent area of the surface to be heated. The heating element is positioned substantially parallel to and adjacent the surface to be heated. The heating system includes electronic circuitry which essentially eliminates transmission of power surges, voltage spikes and chatter when the heating system is connected to an alternating current power source. The heating system also includes protective circuits and devices for preventing injury or damage due to transformer overheating, or due to under-current or over-current conditions. An optional electronic circuit permits use of the device for preventing formation of ice on surfaces in an efficient and economical manner.

18 Claims, 6 Drawing Figures

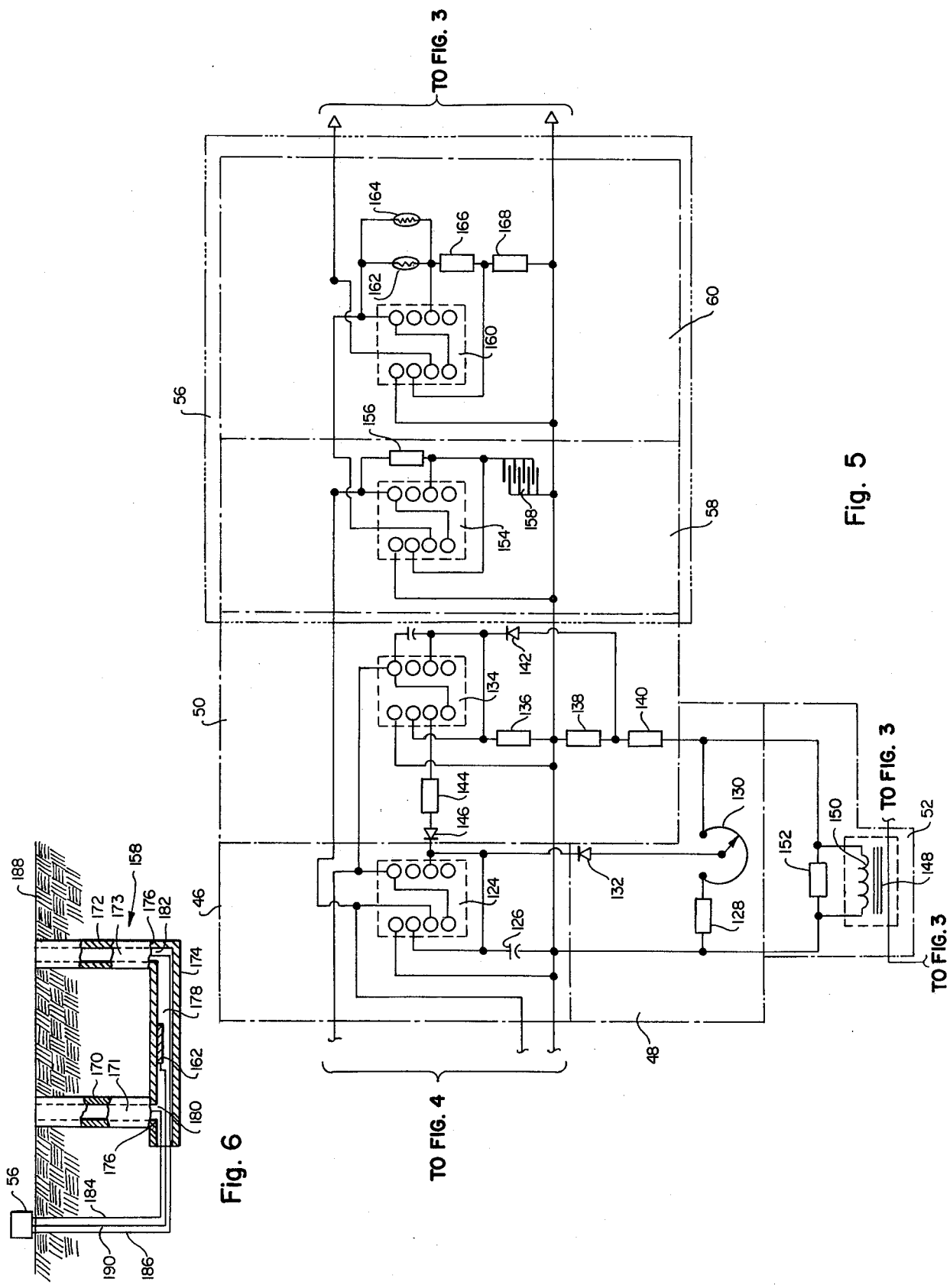

ELECTRICAL HEATING SYSTEM

FIELD OF THE INVENTION

The present invention relates to electrical heating systems and more particularly to electrical surface heating systems such as those which may be embedded in the floors or walls of rooms.

BACKGROUND OF THE INVENTION

Electrical surface heating systems are well known and have been used for heating ceiling, wall and floor surfaces in rooms, as well as outdoor surfaces, for many years. These systems generally involve the placement of one or more lengths of electrical conducting material beneath and in contact with the surface to be heated. By transmitting electrical current through the conducting material, heat is generated and then transferred to the contacting surfaces.

The use of electrical surface heating systems in floors has numerous advantages over other types of heating systems such as base-board or forced air systems. For example, the heat from base-board and forced air heating systems begins traveling upward by means of convection as soon as it is introduced into the room interior. Thus, at positions remote from the heat source, very little warm air remains near the floor surface while the ceiling area is quite warm. In fact, with many base-board and forced air heating systems the air temperature at the ceiling may be as much as 40° F. warmer than the air temperature at the floor. Thus, if one wishes to maintain air temperatures near the floor at a comfortable level, the base-board or forced air heaters must introduce heat in quantities which produce comfortably high temperatures near the ceiling. This heat continues to travel upwards, passing through the ceiling and through the roof to the outside atmosphere. It is clear that such a situation is energy inefficient and, therefore, undesirable in light of present attempts both to conserve energy resources and to reduce heating costs.

In contrast, with essentially uniform heating of the floor surface a much lower temperature gradient is experienced between the floor and ceiling of a room. In fact, temperature differences of as little as 3° F. between the floor and the ceiling of a room are easily achievable in normal home operation of a system which provides uniform heating of the floor surface. This is because the heat is emitted uniformly across the floor surface and then permeates through the entire room space above the floor as it travels upward to the ceiling. In addition, because of the uniform room heating, the floor temperature need only be slightly higher (i.e. one or two degrees Fahrenheit) than the desired room air temperature in order to maintain that desired temperature.

Numerous problems have been encountered in past attempts to obtain uniform heating of floor surfaces by means of conductors embedded therein. For example, if the conductor is not in contact with all the surfaces to be heated, the heat must be transferred from that portion of the surface which does contact the conductor to those surface areas which do not contact the conductor. Such a transfer involves large thermal gradients or temperature differences across the floor surface and thus, in order to maintain a desired average floor temperature, the floor surface in contact with the conductor must be raised to a temperature which may be much higher than the desired average temperature.

In cases where conductors are spaced too far apart, the conductor temperatures necessary to achieve the desired average floor temperatures are sufficiently high that "hot spots" are created which may cause scorching and fire damage to the floor surface or to heat sensitive materials positioned upon the floor near the conductor.

The "hot spot" problem is not adequately overcome by running a single conductor back and forth through the floor along close parallel paths, since voltage drop along the length of the conductor increases to unacceptable levels as conductor length increases. In attempting to overcome this problem by other means, metallic strips have sometimes been placed in the floor so as to contact much of the floor near its surface. Although this prior art system experiences a low overall voltage drop, numerous problems have been experienced both in the installation and in the operation of such metallic strips. For example, expansion of the metallic strips during heating, or movement of the strips in response to people walking on the floor, may cause crinkling noises or other types of noises which are clearly audible from the floor surface.

Such problems are particularly common when the metallic strips are very thin in construction. In addition, the very thin conductors break easily, are suseptible to being cut during installation, pose a hazard to the installer due to their sharp edges, and are also susceptible to being broken after installation if sufficient floor movement is experienced (i.e. movement such as that caused by moving large furniture across the floor). It is well-known that extremely thin strips of metal conductor have a small overall electrical resistance, and thus they require very low current levels to achieve the necessary heating. In light of this, even in the presence of the above-described problems, use of the thinnest metallic strip available continues to be preferred.

Although use of such thin metallic strips reduces energy requirements, truly uniform heating of the floor surface with those very thin strips has not been possible. This is because metallic strips constructed of popular heating materials such as brass cannot be reliably manufactured to uniformly maintain a truly useful thinness of less than about 0.002 inches. As a result of this non-uniformity, uneven heating of the conductor is experienced. Thus, in order obtain uniform heating, the metallic strips are typically thicker than would otherwise be desired, requiring a correspondingly higher current level for producing the necessary heat.

Other attempts to obtain uniform heat distribution in floor surfaces have involved the use of hardware cloth or other wide mesh metallic materials as conductors. Unfortunately, these wide mesh arrangements have also required excessive conductor temperatures in order to obtain acceptable average surface temperatures. As a result of the high conductor temperatures, floor surfaces and materials such as carpeting positioned adjacent to the conductors may eventually become marked with the pattern of the mesh conductors.

In each of the prior art systems described above, as additional heating is called for, voltage through the conductor must be increased. As voltage levels increase, the risk of fire or electrical shock also increases. This condition poses a particular danger to individuals who are laying carpet or fixing articles to a floor by means of screws or nails, or who are otherwise exposed to contact with the conductors.

Although hazards due to electrical shock and fire are present, the previous devices have not provided adequate protective devices to overcome these dangers. For example, when increased conductor heating requirements are encountered, transformers may overheat and become a potential fire hazard. Because of the excessive cost of presently available protective devices, typical prior art systems have not provided any means of recognizing and overcoming transformer overheating problems.

In addition to dangers from over temperature conditions, low voltage electrical systems also pose a great hazard during over-current and under-current conditions. When a short circuit occurs in a low voltage electrical system, high levels of current are transmitted therethrough. However, the protective devices on the typical 240 volt home power supply will very likely not even respond to currents of a magnitude which will do damage in the low voltage situation. Further, even if the current level in the low voltage system is so high as to be detectable by current protection devices on the 240 volt system, the normal time delay of such devices often allows the high current flow to continue for several minutes before the circuit is disconnected. The time delay before disconnection is generally so long that extremely high temperatures in excess of several hundred degrees Fahrenheit may easily be reached in the low voltage heating system.

In situations where the conductive surface becomes ruptured or otherwise experiences an open circuit condition, very little current will be transmitted into the system but extremely high voltage levels may be experienced across the ruptured location. These high voltage levels can result in arcing, which creates a serious risk of fire since temperatures in the arc may exceed several thousand degrees Fahrenheit.

Although the above dangers are often present in prior art electrical heating systems, devices for providing over-current and under-current protection are not practically available for use on low voltage systems. Typical devices used for providing such protection are designed for use in applications where the operating level voltage is in excess of 240 volts. The cost of these devices is sufficiently high that, even if they could be adapted for use in low voltage applications, their use would simply make such systems so expensive as to remove then from consideration as a viable alternative for home heating.

In addition to the other problems, transformers and control equipment in low voltage electrical surface heating systems have previously been directly exposed to possible damage upon their connection to A.C. power systems. If connection of the low voltage system to an A.C. power source is made at a time when the polarity of charge in the transformer coils is significantly out of phase with the A.C. system, a power surge may be experienced through the electrical circuitry which can cause damage to transformers as well as to associated electrical control equipment. This surge can be so large as to produce a jarring shock which is easily audible and may be physically felt by one positioned within the room to be heated. This situation has constituted a substantial stumbling block in previous attempts to provide low-voltage electrical surface heating systems which could be connected directly to an A.C. power source.

Prior art surface heating systems have often been utilized for heating exterior surfaces such as driveways in order to prevent the formation of ice thereon. However, operation of the majority of those systems has required manual initiation with operation continuing until manually terminated. This has made the use of such systems economically unattractive if not unfeasable in many instances. For example, if snow is expected during the night, the user must either periodically get up to see if snow is falling or else turn the system on before retiring to bed. If snow does not come and if the user does not awake and turn the system off, rather large amounts of energy are wasted in unnecessarily heating the exterior surface. Such waste becomes very noticeable upon arrival of the user's monthly electric bill. Attempts have been made to automate the operation of such systems by utilizing moisture detectors to turn on the system. However, although moisture may be detected so that heating is initiated, if air and surface temperature conditions are not right, ice will not form in any event and energy is again wasted. In addition, moisture detectors used in such attempts have typically been designed for positioning away from the surface to be heated, and thus they could detect moisture and turn the heat on even when the surface to be heated was dry.

In light of the above considerations it would be a great improvement in the art to provide an electrical heating system which could be embedded in floors or similar surfaces so as to provide essentially uniform heating across the associated surface while minimizing the amount of electrical power required to achieve the desired heating. A further improvement in the art would be to provide such a heating system which could be installed and operated with very little possibility of malfunction or failure due to electrical shorting or physical breaking of the heating element.

Still a further improvement in the art would be to provide such a heating system which would operate at low voltage and low current levels and which would pose essentially no hazard of shock to persons contacting the heating element surface. It would also be an important improvement in the art to provide such an electrical heating system which could be connected to an A.C. voltage source in a synchronized manner so that as to avoid power surges. Still another important improvement in the art would be to provide such an electrical heating system which includes protective devices for preventing fire or other damage due to transformer overheating or due to over-current or under-current conditions in the heating system. A still further improvement would be to provide such a heating system which could automatically prevent formation of ice on exposed surfaces in an energy efficient and economical manner.

SUMMARY AND OBJECTS OF THE PRESENT INVENTION

The present invention comprises a low voltage electrical heating system which may be embedded in a surface such as a floor so as to provide essentially uniform heating across the entire surface with a heating element temperature of only a few degrees above the desired room temperature. The electrical heating element comprises a continuous mesh strip constructed of small gauge wire. The total surface area of the wire in the mesh is at least equal to, and preferably exceeds, the total surface area of the floor to be heated. The spacing between wires in the mesh is sufficiently small that the air within the spacing remains at a temperature essentially equal to that of the heated wires.

Protective circuitry is included for preventing power surges upon connection of the heating system to an A.C. power source and for identifying excess transformer heating, as well as over-current or under-current conditions present in the system, and for disconnecting the system during such conditions. In addition, circuitry is provided for detecting conditions conductive to formation of snow or ice on outside surfaces and for controlling the operation of the heating system in response thereto when the system is used for preventing ice formation on such surfaces.

It is, therefore, a primary object of the present invention to provide an electrical heating system which may produce essentially uniform heating across a floor or similar surface.

An important object of the present invention is to provide an electrical heating system for use in heating floors or similar surfaces, which may be installed and operated without danger of electrical short-circuit or physical separation of the heating element as a result of normal handling and operation.

A further important objective of the present invention is to provide an electrical heating system for heating floors or similar surfaces which is operated at low voltage and low current levels so as to avoid the possibility of electrical shock to persons contacting the heating element.

Still another important object of the present invention is to provide system control circuitry which permits the synchronized connection of the low voltage heating system to an A.C. power source.

Another important object of the present invention is to provide protective circuitry which may be used in conjunction with a low voltage electrical heating system for identifying conditions of excessive transformer heating and for disconnecting the system from the power source in response thereto.

It is also an important object of the present invention to provide electronic circuitry for use in a low voltage heating system for identifying even slight over-current or under-current conditions and for disconnecting the heating system from the power source in response thereto.

Yet another important object of the present invention is to provide electronic circuitry for causing an electrical heating system to maintain a surface area at a temperature which will prevent formation of ice thereon, only during conditions in which such ice formation is possible.

Still a further important object of the present invention is to provide a method of heating surfaces without danger of injury to persons from electrical shock or of damage to the heating system or nearby objects resulting from transformer overheating, or from overcurrent or undercurrent conditions.

Even a further important object of the present invention is to provide a method for connecting electrical systems such as heating systems for alternating current power sources with substantially no transmission of power surges, voltage spikes or chatter between the power source and the electrical system.

These and other objects and features of the present invention will become more fully apparent from the following description and appended claims taken in conjunction with the accompanying drawings.

BRIEF DESCRIPTION OF THE DRAWINGS

FIG. 5 is a schematic circuit diagram of the current control and snow detection and control portions of the present invention.

FIG. 6 is a side sectional view of a preferred embodiment of a moisture and surface temperature sensing device for use with the present invention.

DETAILED DESCRIPTION OF THE PREFERRED EMBODIMENT

Reference is now made to the figures wherein like parts are designated with like numerals throughout.

Figure 1:
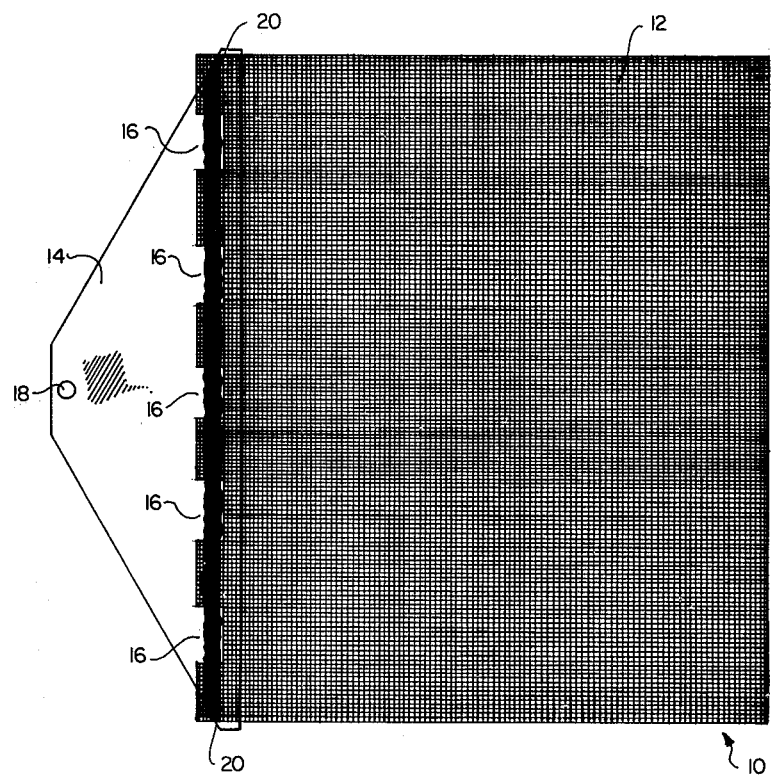
FIG. 1 is a top plan view of one preferred embodiment of the conductive heating element and electrical conductor of the present invention.

The conductive heating element of the present invention is generally illustrated at 10 in FIG. 1. Typically, conductive heating element 10 is comprised of a plurality of electrically conductive wires which are combined so as to form a mesh surface (also referred to herein as "screen") 12. The individual wires used in mesh surface 12 are preferably comprised of nonmagnetic nonferrous material such as bronze. The nonmagnetic properties of the wire prevent magnetic coupling in the presence of electric currents, and thus they prevent the "humming" or "singing" of the wires which often accompanies such magnetic coupling.

In order to minimize excessive thermal gradients in the adjacent floor surface, it is desirable that the surface area of the wires in mesh surface 12 be substantially equal to, or greater than, that area of the adjacent floor surface to be heated which is within a perimeter defined by the edges of mesh surface 12. In one preferred embodiment of the invention this relationship is achieved by utilizing bronze wire which is 0.011 inch in diameter and spacing these wires so that there are eighteen per inch in the longitudinal direction of element 10, and 14 per inch across the width of element 10. This wire spacing provides a total wire surface area which is approximately 110% the area of that portion of an adjacent surface lying with in the perimeter of the wire mesh surface 12.

The air space between wires in the above configuration is only approximately 0.030 inches. Because these spaces are so small, the air within them experiences a boundary layer effect, and actually takes on the temperature of the adjacent wires in the mesh surface 12. Thus, in contrast with prior art heating systems, rather than losing heat to the air in the spaces between wires, the system of the present invention actually utilizes the air within those spaces as an additional temperature surface which functions to transfer heat into the adjacent floor surface.

The mesh surface 12 may optionally be protected with a coating of varnish to prevent oxidation of the bronze wires. Varnish is itself a conductor of heat, and thus no highly undesirable influence is created by the varnish on the ability of the system to transfer heat.

Mesh surface 12 is connected to a power source (not shown) by means of a tabbed connector 14, which is comprised of an essentially triangular copper metal plate having a series of cut-out tabs 16 positioned over apertures in the surface of connector 14. One end of wire mesh surface 12 is inserted between cut-out tabs 16 and their adjacent apertures, and then the tabs are forced downward so as to secure portions of the end of mesh surface 12 between the cut-out tabs 16 and their associated apertures. To insure a permanent connection between wire mesh surface 12 and tabbed connector 14, solder 20 is applied so as to extend between the secured edge of mesh surface 12 and cut-out tabs 16. Thus, a positive connection of the connector 14 to the mesh screen 12 is accomplished by the combination of mechanical and solder connections. Because of this positive connection between connector 14 and the entire end of screen 12, electrical current is distributed substantially evenly onto the entire width of screen 12.

An aperture 18 near the apex of tabbed connector 14 provides an attachment point for connecting the heating element portion 10 to a source of electrical power.

The conductive heating element 10 is installed to the sub-floor of a building in strips which are typically approximately twelve inches wide and of the approximate thickness of paper. A thin protective board covering is positioned above the heating element 10, and floor covering such as linoleum, wood, carpet, stone, tile etc., may then be installed upon the board covering. Because of its mesh arrangement, nails or similar objects may be forced through wire mesh surface 12 without affecting the performance of the heating system.

The strength and flexible qualities of mesh surface 12 essentially prevent accidental breaking or separation of significant portions of surface 12 in normal use. Even if a portion of surface 12 were cut through, electrical current would continue to travel through the connected conductors and thus no disruption of service need result. However, current flow through the connected conductors would necessarily increase somewhat and thus, if the separation were large enough, overcurrent and undercurrent protective devices such as those described hereafter would act to prevent further system heating.

In operation of the above-described configuration, transmission of a low voltage of approximately 0.11 volts/foot A.C. across the installed heating element 10 produces a temperature of approximately 72° F. on the wire mesh surface 12. By increasing or decreasing the voltage applied across the heating element 10, the flow of electrical current through mesh surface 12 and thus the temperature produced therein also increase or decrease proportionately.

The heat generated on wire mesh surface 12 is transferred uniformly to the adjacent board covering and on into the floor covering. Air adjacent to the floor covering becomes warmed and begins a slow migration upward therefrom. Thus, essentially uniform heating of air the room is accomplished.

The operation of the electrical heating system and its protective and control circuitry may be generally described by reference to the block diagram of this system illustrated in FIG. 2.

Figure 2:
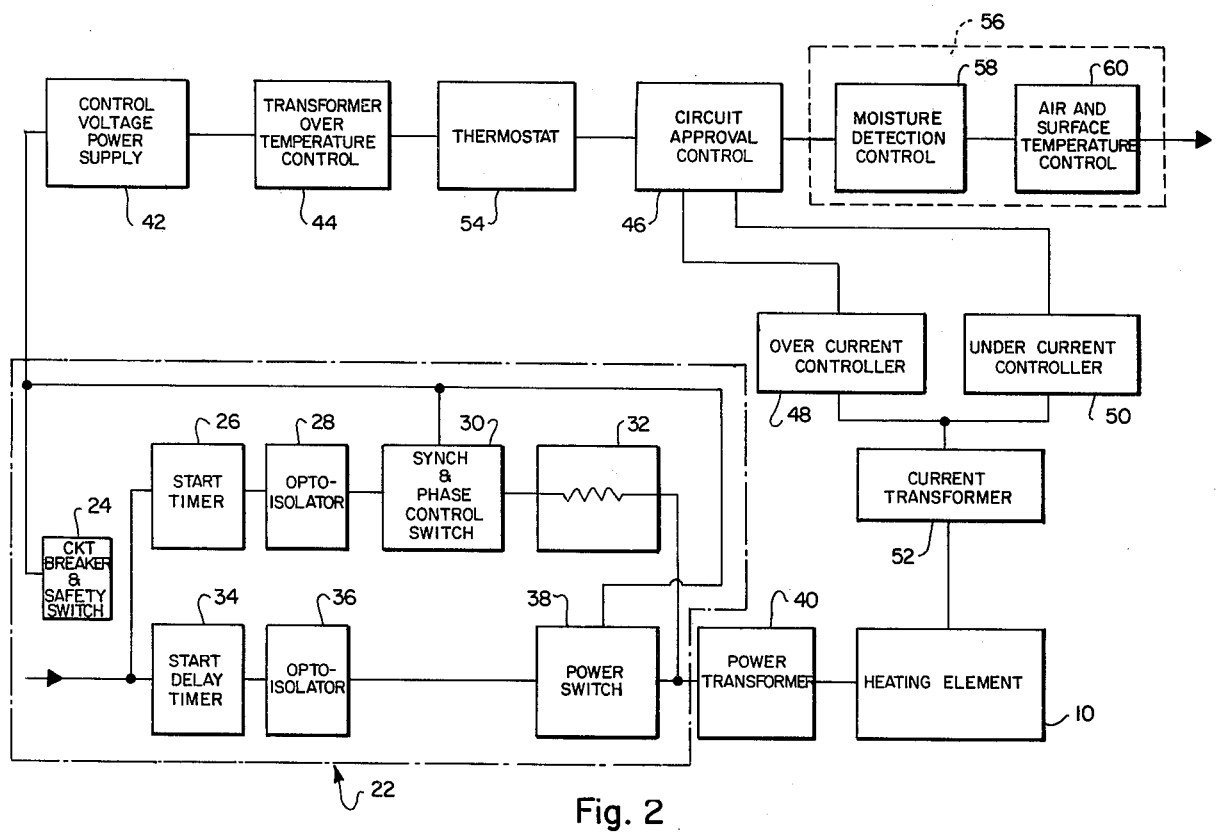
FIG. 2 is a block diagram of a preferred embodiment of the electrical heating system of the present invention.

Circuitry which comprises a synchronous switching system is generally illustrated at 22 of FIG. 2. The synchronous switching system 22 operates so as to permit full current flow from the A.C. power source into the electrical heating system only when the heating system is synchronized with the A.C. power source. This is an important feature in preventing damage to the connected heating system and control circuitry as a result of power surges generated in response to out of phase closing of the heating system onto the A.C. voltage system.

It is well-known that A.C. power comprises voltages and currents which are continuously changing in sinusoidal fashion. Thus, circuit elements connected to such a power source necessarily become synchronized with it. For example, in A.C. circuits, the polarity of the magnetized iron transformer cores varies in synchronization with the polarity of the alternating current. Once the circuitry is disconnected from the power source, the transformer core remains polarized in one direction. At the time the circuit is reconnected to the A.C. power source, if the polarization of the transformer core is out of phase with that of the power source, a very small resistance is seen by the incoming power and a potentially damaging power surge may be transmitted across this low resistance into the electrical circuitry. The heating system of this invention, as with substantially all other floor heating systems, can be susceptible to the creation of such power surges.

In order to avoid the damage which may be caused by such power surges, the synchronous switching system 22 insures that the electrical heating system of this invention will be connected to the A.C. power source only when these two entities are essentially synchronized with each other. The synchronous switching system 22 includes a start timer 26 which responds to activation signals from other control equipment.

Timer 26 functions as a countdown timer to prevent connection of the heating system to the power source if "chatter" is present. "Chatter" is comprised of spurious voltage and power signals which may be produced in response to bouncing of switch contacts, or other physical jarring of electrical circuitry, such as vibration of a thermostat in response to physical contact. If the activation signal remains constant, with no chatter for a set period of time (0.5 seconds has been found to be a reasonable period), then a signal is transmitted from start timer 26 to a first opto-isolator 28.

Opto-isolator 28 functions to insulate the high voltage A.C. side of the synchronous switching system circuitry 22, from the low voltage D.C. side thereof, thus preventing a back feed of the high voltage A.C. power into the low voltage D.C. circuitry after circuit connection.

Upon receiving a signal from its high voltage side, isolator 28 emits a signal from its low voltage side which is detected by a synchronization and phase control switch 30. The input of control switch 30 is connected to the A.C. power source by a direct line to a 240 volt circuit breaker and safety switch 24. Upon detecting the signal from isolator 28, the synchronization and phase control switch 30 turns on and permits the through flow of current from the 240 volt A.C. source. The current from control switch 30 flows through a power level damping resistor 32 which is sized so that a majority of the current is dropped therein, with only a small amount being transferred to a power transformer 40.

Upon receiving the A.C. current from resistor 32, the iron circuit of power transformer 40 is caused to magnetically charge and to become polarized and synchronized with the connected A.C. system. Even if transformer 40 is initially out of phase with the A.C. system, the amount of current involved is so small that no appreciable power surge is detected. Nevertheless, the current received from resistor 32 is sufficient to charge transformer 40 and bring it into synchronization with the A.C. system.

Concurrent with the transmission of the signal from timer 26 to isolator 28, another signal is transmitted from timer 26 to a start delay timer 34. As with timer 26, timer 34 comprises a countdown timer which delays the introduction of full power from the A.C. source to transformer 40 until that transformer has become charged and synchronized (a reasonable time for this delay has been found to be approximately 0.15 seconds).

Upon expiration of the specified time, start delay timer 34 transmits a signal to a second opto-isolator 36, indicating that full power from the A.C. source may be introduced on the inputs of transformer 40. Isolator 36 functions to prevent communication of the low voltage D.C. portion of the heating system circuitry with the high voltage A.C. portion.

Isolator 36 transmits a signal to power switch 38, causing switch 38 to turn on and permit full power flow from the A.C. source to the power transformer 40.

Power transformer 40 operates with a low side voltage of not more than 30 volts, and typically not more than 0.11 volts per square foot of heating element 10. Current from transformer 40 is passed onto the conductive heating element 10 so as to cause that element to produce heat essentially uniformly across its entire surface. The amount of heat produced by element 10 is regulated by control of the low side voltage taps on transformer 40, so as to produce the desired power flow on element 10.

The control and protective circuitry associated with the electrical heating system may also be described by reference to FIG. 2. The control circuitry obtains its operating energy through control voltage power supply 42 which is itself connected to the A.C. power source through the 240 volt circuit breaker and safety switch 24. Power supply 42 transforms, rectifies, and filters the voltage from the A.C. power source so as to produce approximately 14 volts D.C. at the output of power supply 42.

The transformer over-temperature control 44 monitors the temperature of power transformer 40, and responds to temperatures exceeding a specified maximum by turning off its positive output and thus disconnecting the power transformer 40 from the A.C. power source. After transformer 40 cools below a predetermined temperature level, transformer over-temperature control 44 turns on its positive output and enables transformer 40 to again be connected to the A.C. power source.

The output of transformer over-temperature control 44 is connected to the zone temperature thermostat 54. Thermostat 54 includes one or more temperature sensing devices for monitoring the temperature in the area to be heated. If the monitored temperature is below a particular minimum level, thermostat 54 closes its positive terminal so as to enable connection of the A.C. power source to transformer 40 and to thus cause heat production within heating element 10. If the monitored temperature exceeds a specified maximum level, thermostat 54 opens its positive terminal so as to disconnect the A.C. power source from the transformer 40, thus preventing further heat production by heating element 10.

A circuit approval control 46 is connected to thermostat 54 so as to disable heater operation during over-current or under-current conditions within the heating system. Specifically, circuit approval control 46 disables heating system operation in response to over-current signals received from an over-current controller 48, as well as to under-current signals received from an under-current controller 50. Both over-current controller 48 and under-current controller 50 are connected to a current transformer 52, which samples current flowing between the conductive heating element 10 and the power transformer 40.

Over-current controller 48 monitors the level of current flow detected by current transformer 52, and if this current flow exceeds a specified threshold level, over-current controller 48 produces a signal causing circuit approval control 46 to disconnect the electrical heating element 10 from the A.C. power source.

The under-current controller 50 monitors the current level detected by current transformer 52. If this current goes below a specified minimum level, controller 50 produces a signal which causes circuit approval control 46 to disconnect the electrical heating element 10 from the A.C. power source.

Over-current controller 48 is particularly valuable in preventing excessive heating within heating element 10, as well as in preventing dangerous overheating of the various circuit components as a result of short circuit or similar conditions in the system. Likewise, under-current controller 50 is extremely valuable in preventing dangerous arcing and production of high voltages during open circuit conditions. In typical operation, these devices are set to disconnect the heating system upon detecting a change of plus or minus 5% in current flow on the heating element 10.

An ice prevention circuit 56 may optionally be included in the electrical heating system. When this option is included, the necessary circuitry is inserted in the otherwise direct connection between thermostat 54 and start timer 26. The ice prevention circuit 56 is typically used in applications where the heating system is installed in exterior surfaces such as driveways, in order to prevent formation of ice thereon.

Ice prevention circuit 56 includes a moisture detection control 58 and an air and surface temperature control 60. The moisture detection control 58 comprises a circuit which is sensitive to the presence of very small amounts of moisture, and which may be positioned so as to accuractely detect the presence of moisture upon the surface to be heated.

The air and surface temperature control 60 becomes activated when moisture detection control 58 detects the presence of moisture. At this time air and surface temperature control 60 samples the temperature of the air and of the exterior surface to be heated by means of temperature sensors positioned in or near that exterior surface. If monitored conditions indicate that ice may form on the exterior surface, control 60 enables connection of the A.C. power source and transformer 40 so as to cause heating within element 10, which is embedded within the exterior surface.

In a typical application of ice prevention circuit 56, the perameters used for determining whether heating should be initiated are as follows: (1) if both air and surface temperatures are above 33° F., formation of ice is unlikely and heating is not required; (2) if both air and surface temperatures are below 33° F., heating should be initiated in anticipation of freezing; or (3) if the average of the air temperature and the surface temperature is equal to or less than 33° F., heating should be initiated in anticipation of freezing.

By reference to FIGS. 3 through 6 it is now possible to discuss the various components which comprise those sections of the heating system illustrated generally in FIG. 2.

Figure 3:
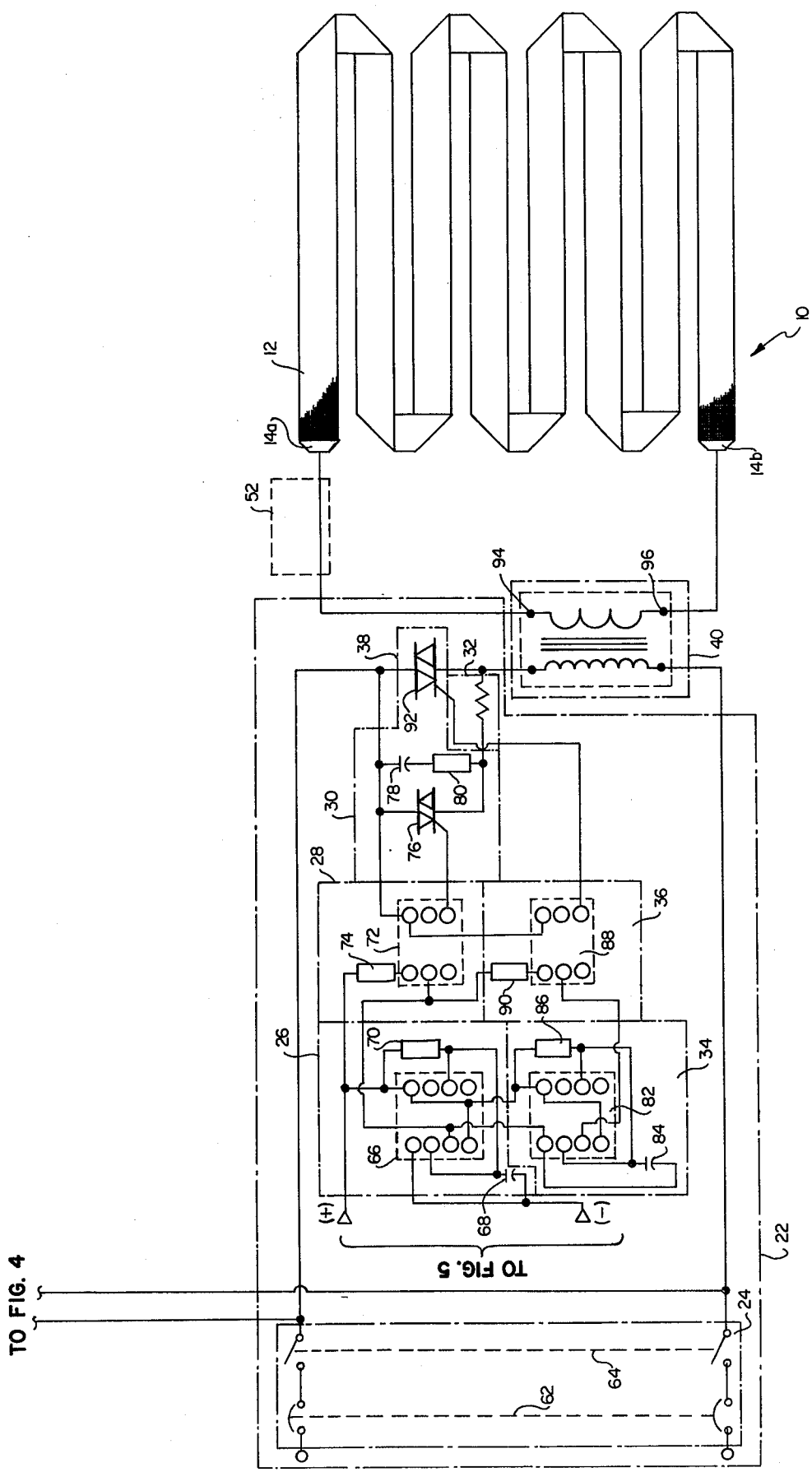
FIG. 3 is a schematic circuit diagram of the synchronized switching system and the zone heating element of the present invention.

By particular reference to FIG. 3, the components of the synchronous switching system 22 and conductive heating element 10 may be described. Specifically, the circuit breaker and safety switch 24 is comprised of a two-pole, 20 ampere circuit breaker 62 which is connected at its positive and negative terminals to the corresponding terminals of a 20 ampere safety switch 64. These switches are both positioned on the 240 volt A.C. power source side of the electrical heating system of this invention.

The start timer 26 is comprised of a solid-state timer 66 such as an MC-1455P, providing an output which remains off until the expiration of a predetermined time. The time period for timer 26 is determined by the size of a capacitor 68 and a resistor 70 attached to the inputs thereof. On the MC-1455P device this relationship is determined by the equation: time (seconds)=1.1 $(R \times C)$. Thus, for time=approximately 0.5 seconds, the values could be time=1.1 $(4.7 \times 10^6 \times 0.1 \times 10^{-6})$=0.517 seconds.

The first opto-isolator 28 comprises an optically isolated triac driver 72 such as an MOC 3021, which includes a light emitting diode on the input portion and a light sensitive triac on the output portion. When timer 26 reaches the predetermined time and its output is turned on, a voltage difference is produced between the inputs and outputs of the triac driver 72. In response to the voltage on the input portion, a light emitting diode produces light which is sensed by a light sensitive triac on the output portion of driver 72. This triac produces a signal which is transmitted to the synchronization and phase control switch 30.

Control switch 30 includes a triac 76 which is typically a 15 ampere triac such as a Q4015LT produced by Teccor Electronics, Inc. The input portions of both the triac driver 72 and the triac 76 are connected to the 240 volt A.C. power source, and thus the signal from triac driver 72 is connected to the triac 76 so as to cause it to conduct and permit power flow therethrough. Also connected to the 240 volt power source and in parallel with triac 76 are a capacitor 78 and resistor 80 which are present for voltage surge suppression.

The output of the synchronization and phase control switch 30 passes to a power level damping resistor 32 which is sized so as to cause a current flow of only approximately two to approximately seven amperes (depending upon the heating load) therethrough. This small amount of current appears on the primary winding of power transformer 40, which comprises a transformer such as an NMI 1216, having a primary 240 volt terminal and a secondary terminal which may vary between 2 volts and 30 volts, depending upon the number of windings.

The small amount of current transmitted from resistor 22 through transformer 40 charges the iron circuit of that transformer and synchronizes the molecules of iron such that the A.C. power source sees the maximum impedance of transformer 40.

Start delay timer 34 provides the delay time necessary to permit the charging and synchronization of transformer 40 before full power is introduced on the high side of transformer 40. Start delay timer 34 is identical in construction to start timer 26 with the exception that its circuit components are sized so as to produce a different time delay period. The components of start delay timer 34 include a solid-state timer 82, such as an MC-1455P, a capacitor 84 and a resistor 86. In order to obtain a delay time of approximately 0.15 seconds, a typical capacitor value of 0.1 microfarad and a resistor value of 1.5 megaohms may be utilized.

The output of the solid-state timer 82 is connected to an optically isolated triac driver 88 such as an MOC 3021 which is combined with a resistor 90 to comprise the second opto-isolator 36. Isolated triac driver 88 is identical to isolator 72, and is connected through isolator 72 on its high voltage A.C. side to the 240 volt A.C. power source. The output is isolator 88 is connected to an input of a 25 ampere triac such as a Q4025P, manufactured by Teccor Electronics, Inc., which comprises the power switch 38. Triac 92 is connected on its input portion to the 240 volt circuit breaker and safety switch 24 and on its output side to the high side winding of transformer 40.

In operation, when start delay timer exceeds a predetermined time period, it transmits a signal to triac driver 88. This signal is detected by a light emitting diode in triac driver 88, which turns on in response thereto and activates a light sensitive switch on the output side of triac 88. The light sensitive switch provides a signal to triac 92 which turns on that device and permits full power to flow from the 240 volt A.C. power source into the high side winding of transformer 40.

The positive low side terminal 94 of transformer 40 is connected to the tabbed connector 14a of heating element 10. Connector 14a permits current flow from transformer 94 to pass essentially uniformly onto the end of wire mesh surface 12, which conducts the current along its length to a second tabbed connector 14b attached to the output end of the wire mesh surface 12. Tabbed connector 14b is attached to the negative low side terminal 96 of transformer 40 so as to complete the electrical circuit.

The wire mesh surface 12 is embedded within the surface to be heated so as to form a series of parallel strips extending lengthwise between the boundaries of the surface, with the strips extending in essentially adjacent parallel alignment between the top and bottom boundaries of the surface to be heated. The parallel strips are formed by folding the mesh strip in two sequential 90° folds. Of course it is recognized that mesh surface 12 could be positioned in any configuration which would provide for the proper heating of the associated surface.

It is noted that the strips formed by mesh surface 12 are positioned adjacent but not in contact, since contact between parallel strips would produce a short circuit in the current path along the strip length. The actual amount of current and voltage present on the mesh surface 12 is based on the resistance of the bronze conductor of mesh surface 12, as well as on the desired amount of heat to be produced. It is typcically desirable to maintain the heating at approximately 33 BTU (British thermal units) per square inch of mesh surface 12. Thus, when mesh 12 is comprised of bronze wires which are 0.0011 inch in diameter, the production of 33BTU per square inch requires approximately 10 watts per square foot on mesh surface 12. For conductor lengths required for most home uses, this requires less than 100 amperes of current through the circuit, and this amperage level may be maintained by a source voltage of about 0.11 volts per square foot of screen surface 12. Of course, as the length of mesh screen surface 12 increases with room size, the amount of voltage necessary or heater operation must only increase by about 0.11 volts per square foot. Thus, when mesh surface 12 is comprised of bronze wire, large increases in length are necessary in order to cause even small increases in voltage source requirements.

Figure 4:
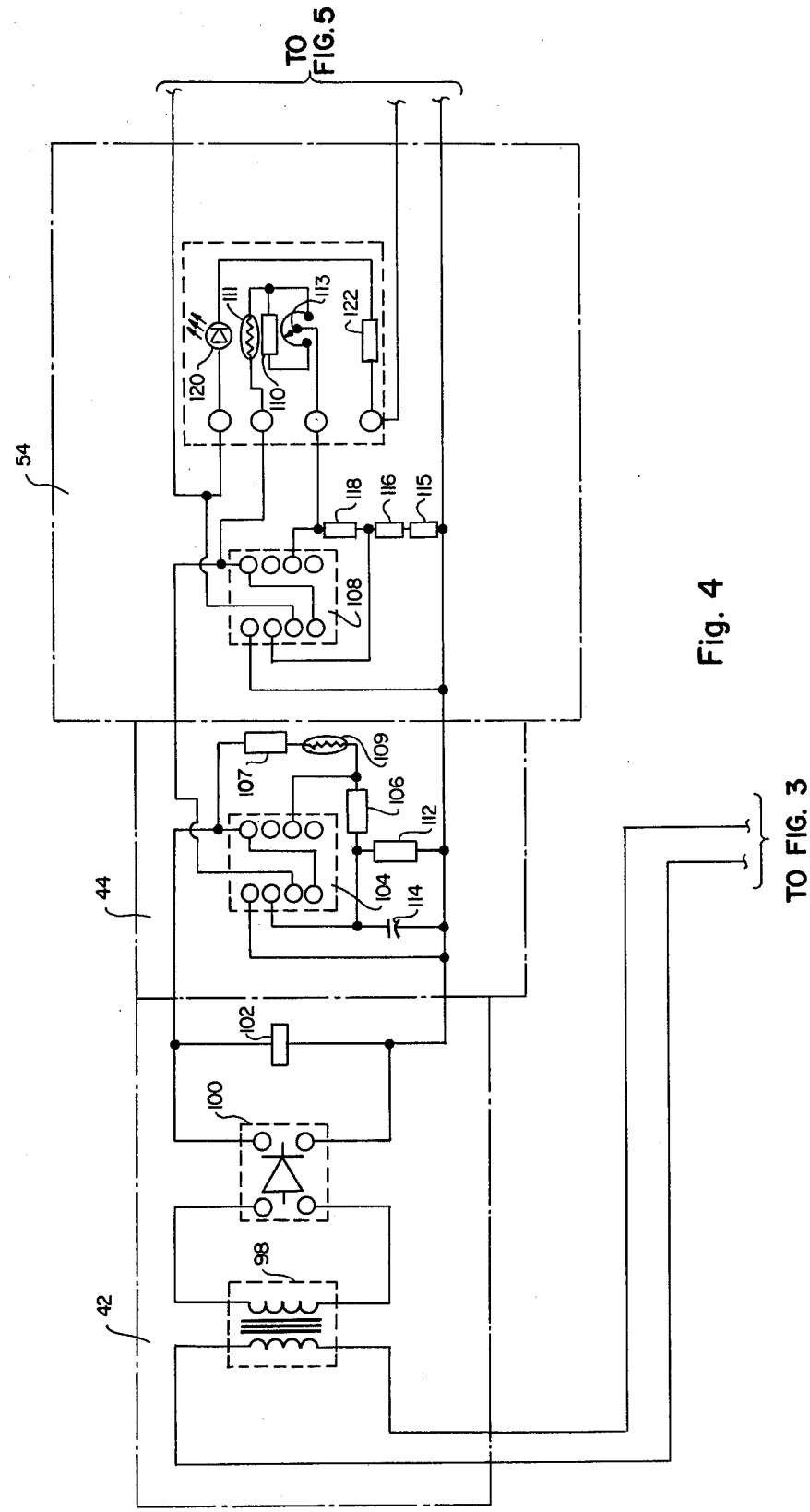
FIG. 4 is a schematic circuit diagram of the control voltage power supply and temperature control portion of the present invention.

By reference to FIG. 4 it is possible to present a more detailed discussion of the circuitry comprising the control voltage power supply 42, the transformer over-temperature control 44, and the zone temperature thermostat 54.

Control voltage power supply 42 includes a transformer 98 such as a 240 volt/14 volt A.C. 60 cycle NNI 1197. The high side terminals of transformer 98 are connected to the 240 volt A.C. power source through circuit breaker and safety switch 24. The low side output of transformer 98 is connected to a full wave bridge rectifier 100, such as a VM08. Voltage received from transformer 98 is rectified in rectifier 100 and the resultant D.C. voltage is then filtered by an electrolytic capacitor 102 which is connected parallel to the output of rectifier 100.

The filtered D.C. output from control voltage power supply 42 is connected to a solid-state timer 104 such as an MC-1455P, within transformer over-temperature control 44. Solid-state timer 104 is connected so as to define a voltage level sensing latch switch. Timer 104 is connected through resistive element 106 and 107 to a thermistor 109 which may be embedded in the windings of transformer 40. Thermistor 109 produces a voltage signal in proportion to its changing resistance which reflects the temperature of transformer 40, and timer 104 is constructed so as to be responsive to the voltage signal from thermistor 109 and to turn off the positive output of timer 104 when the voltage from thermistor 109 exceeds a specified threshold value.

Timer 104 is additionally designed to turn its positive output back on when the signal from thermistor 109 indicates that the temperature of transformer 40 has fallen below a specified minimum value. Resistors 106 and 107, shunt resistor 112 and shunt capacitor 114 are sized so as to bias the voltage signal received from thermistor 109, and thus to identify the maximum and minimum temperatures on transformer 40 which will cause switching in timer 104. A typical maximum transformer heating temperature is approximately 210° F., while the minimum temperature for turning the system back on is approximately 190° F.

Whenever the positive output of transformer over-temperature control 44, or of any of the other control circuits, is turned off, signal is transmitted to timer 26 causing isolators 28 and 36 to become disabled. Upon being disabled, isolators 28 and 36 produce signals which are transmitted to synchronization and phase control switch 30 and power switch 38, respectively, turning off the triacs in those respective circuits and thus disconnecting transformer 40 from the 240 volt A.C. power source. When the positive terminal of all control circuits is on, then transformer 40 may be connected to the 240 volt A.C. power source in the manner previously described.

The zone temperature thermostat 54 is connected to the positive output terminal of transformer over-temperature control 44. Thermostat 54 functions as a voltage divider which produces a voltage whose magnitude is proportional to air temperature levels sensed by a thermistor 111. A solid-state timer 108 such as an MC-1455P is connected in a manner identical to timer 104, so as to define a voltage level sensing latch switch. Additionally included in the voltage divider portion of this circuit is the parallel combination of a linearization resistor 110 and a potentiometer 113, with this combination being connected in series to thermistor 111. A differential temperature calibration resistor 115 and dividing resistors 116 and 118 are connected in shunt relationship to the thermistor circuit, as well as to the timer 108.

The resistance of thermistor 111 decreases as temperature increases, due to its negative coefficient of resistance. Thus, with potentiometer 113 set at a desired position, as the temperature measured by thermistor 111 increases, the voltage between potentimoeter 113 and the input of timer 108 correspondingly increases. When this voltage exceeds two-thirds the value of the control voltage from power supply 42, timer 108 turns off its positive output terminal and shuts off the heating system as described above. As the temperature of thermistor 111 drops, its resistance increases and causes a reduction in the current through resistors 114 and 116. This condition caused a corresponding lowering the voltage level between resistors 116 and 118. When the voltage between resistors 116 and 118 falls below one-third the level of the voltage from control voltage power supply 42, timer 108 will turn on its positive output terminal, thus reenergizing the heating system.

Also positioned on zone termperature thermostat 54 is a light emitting diode 120. The anode of diode 120 is connected to the positive output terminal of timer 108, and the cathode of diode 120 is connected through a current limiting resistor 122 to the positive output terminal of the circuit approval control 46 (see FIG. 5). When the positive output terminal of circuit approval control 46 is turned off as a result of an over-current or under-current condition, and when the positive output terminal of timer 108 is turned on, current will pass through light emitting diode 120 and current limiting resistor 122 so as to cause illumination of diode 120. By this means a person may determine that the heating system has been turned off as a result of over-current or under-current conditions, and not because the thermostat is turned off.

By reference to FIG. 5, it is possible to provide a more detailed description of the circuitry which comprises the circuit approval control 46, the over-current controller 48, the under-current controller 50, the current transformer 52, and the optional ice prevention circuit 56.

Circuit approval control 46 comprises a solid-state timer 124 such as an MC-1455P, which is connected in a manner similar to timers 104 and 108 so as to define a voltage sensitive latch-off switch. A capacitor 126 is connected between ground and timer 124 for voltage stabilization. Timer 124 serves as a switch to turn off the heating system in response to signals from the over-current controller 48 or the under-current controller 50.

The over-current controller 48 comprises a resistor 128 and potentiometer 130 which are connected so as to provide a variable resistance network for selecting the magnitude of current flow in heating element 10 which will cause the heating system to be turned off. The voltage drop across the terminals of potentiometer 130 is a function of the setting of the resistance network, and is proportional to voltage signals from current transformer 52. In a manner which is more fully explained hereafter, current transformer 52 produces voltage signals which correspond to the magnitude of current flow within heating element 10.

The anode of a clipping diode 132 is connected to the output of potentiometer 130 and the cathode of clipping diode 132 is connected to the input of timer 124. Thus, diode 132 acts as a half-wave rectifier and permits only the positive half-wave of the A.C. signal from potentiometer 130 to appear on the input of timer 124. Timer 124 is set such that if the RMS voltage appearing at its input exceeds two-thirds of the voltage level from control voltage power supply 42, timer 124 will turn off its positive terminal so as to disconnect the heating system from the A.C. power source.

Once the heating system has been disconnected from the A.C. power source in response to an over-current or an under-current condition, the positive output of timer 124 remains off even though the condition causing timer 124 to turn off has been removed. To cause timer 124 to turn its positive terminal on and enable heating system operation, the cause of the over-current or under-current condition must first be removed. Then, the voltage service to timer 124 from the control voltage power supply 42 must be momentarily interrupted. This may be accomplished by opening and reclosing the switch 64, or the circuit breaker 62, or by quickly turning thermostat 54 off and back on. In response to his condition, the positive terminal of timer 24 is turned on so as to restart the heating system.

The under-current controller 50 includes another solid-state timer 134 which is identical to the solid-states timers 104, 108, and 124. Timer 134 is utilized as a missing pulse detector and a declining voltage level detector. Timer 134 is connected to timer 124 so that during an under-current condition the heating system will be disconnected from the A.C. power source in a manner requiring manual reclosing as explained above.

Resistor 136 is shunted between timer 134 and ground so as to provide voltage stabilization. Resistors 138 and 140 are connected to an output terminal of current transformer 52 and are additionally connected in a parallel relationship to the input terminal of timer 134. Thus, resistors 138 and 140 comprise a voltage divider network. The voltage divider network formed by resistors 138 and 140 defines a voltage level which corresponds to the minimum permissible current level within heating element 10. If current levels below this value are detected, an under-current condition will exist and the heating system will be disconnected from the A.C. voltage source.

In accomplishing this, the voltage signal received from current transformer 52 is transmitted from the junction of resistors 138 and 140 to the anode of a clipping diode 142. The cathode of clipping diode 142 is connected to the input of timer 134. Thus, clipping diode 142 functions as a half-wave rectifier, so that only the positive half-wave of the A.C. signal from current transformer 52 is presented on the inputs of timer 134.

If a bad electrical connection or a torn heater element causes the current in heating element 10 to fall below the minimum specified value (typically approximately 75 amperes) the RMS voltage at the output of diode 142 will fall to a value below one-third of the voltage level from control voltage power source 46. Upon this occurrence timer 134 transmits a signal through a current limiting resistor 144 and an isolation diode 146 to the input of timer 124 in circuit approval control 46. This signal causes the positive terminal of timer 124 to turn off and thus to disconnect the heating system from the A.C. power source. Once again, the positive terminal of timer 124 may be turned on only by manual reclosing as described above.

As previously described, the positive terminal of the timer 124 is also connected to current limiting resistor 122 and light emitting diode 120 of zone temperature thermostate 54. Thus, when the positive terminal of timer 124 is turned off and when the positive terminal of the thermostat timer 108 is turned on, light emitting diode 120 will be illuminated so as to visually indicate that an under-current or over-current condition has caused heating system shutdown.

Current transformer 52 is connected so as to monitor the current level between the positive low side terminal 94 of transformer 40 and tabbed connector 14a (FIG. 3). Current transformer 52 is unique in that it is not a true current transformer. Rather, transformer 52 measures the electrical current within a circuit and produces a voltage signal which correlates to the amount of current measured. To accomplish this, a core 148 is positioned about a portion of the electrical lead between transformer terminal 94 and tabbed connector 14a so as to be magnetically coupled thereto. Preferably, core 148 comprises a bobbin of ferrous material such as iron which is about one-half inch in diameter and about one-half inch in length, with an aperture of about one-quarter inch diameter extending through the center of the bobbin along its longitudinal axis. Around the outside of core 148 is positioned a coil 150 for producing voltage in response to the magnetic flux which eminates from the core.

The voltage produced in coil 150 is proportional to the current flowing between transformer terminal 94 and tabbed connector 14a. This A.C. voltage is applied across resistor 152, which acts as a stabilizing shunt in that it produces a voltage drop which varies in linear relationship with the measured current. Resistor 152 is connected both to the terminals of resistor 128 and potentiometer 130 of over-current controller 50, and to the terminal of resistor 140 in under-current controller 50.

If the heating element 10 is utilized in surfaces which may be subject to the formation of ice, the ice prevention circuit 56 may be included. The positive terminals of this circuit are interposed between the connection which would otherwise exist from the positive output terminal of timer 124 in circuit approval control 46 and an input terminal of timer 66 in the start timer 26 of FIG. 1. The negative terminals of ice prevention circuit 56 are connected to the negative return path from control voltage power supply 42. When the heating system is used for ice prevention, zone temperature thermostat 54 may be used for enabling operation of the ice prevention circuit, or it may be replaced in the circuit by a single pole switch (not shown) for manually enabling the operation of the ice prevention circuit.

The ice prevention circuit 56 is comprised of a moisture detection controller 58 and an air and surface temperature controller 60. The moisture detection controller 58 includes a solid-state timer 154 which is identical to timers 134, 124, 108, and 104. Timer 154 is connected as a momentary switch which turns on in response to detected voltage and is turned off at all other times. The voltage detecting input of timer 154 is connected to a resistor 156 which is itself connected in series with a snow and moisture sensor 158. Snow and moisture sensor 158 may be comprised of any moisture sensing device which can be embedded in the surface to be heated and which has a positive and negative electrode separated such that a connection may be made by contact with moisture, such as snow flakes, rain drops or dew.

One preferred embodiment of the snow and moisture detector 158 may be described by reference to FIG. 6. In this embodiment, detector 158 includes an insulated housing comprised of insulators 170 and 172 and cross member 174. Insulators 170 and 172 are each comprised of solid cylindrical conduit such as polyvinyl chloride (PVC) having a diameter of about one and one-half inches, and a length of about two inches. Apertures 171 and 173 of about one-half inch in diameter extend axially in the center of insulators 170 and 172 through their entire length. Insulators 170 and 172 are chamfered inwardly on their lower ends 176.

Cross member 174 is also comprised of a solid cylindrical conduit having electrical insulating qualities, such as PVC. Cross member 174 is aproximately seven inches long and one and one-half inches in diameter. An aperture 178 of approximately one-half inch in diameter extends axially from an opening in one end of cross member 174 and through its center length to a position about three-quarters of an inch from the other end of cross member 174. Ports 180 and 182 are constructed in alignment with the longitudinal axis of cross member 174 and are positioned about six inches apart in one side of the outer surface of that cross member, with port 182 positioned so that one portion of its edge abuts the end of aperture 178. The edges of ports 180 and 182 are chamfered outwardly so as to conform with the lower edges 176 of insulators 170 and 172.

Insulators 170 and 172 are conformably secured at their lower ends 176 to the chamfered edges of ports 180 and 182, respectively, such that insulators 170 and 172 extend perpendicularly outward from the surface of cross member 174, in parallel alignment with each other.

Electrical conductors (not shown) such as copper or brass are press fit within each of apertures 171 and 173, so that the upper ends of the conductors and the upper edges of insulators 170 and 172 are flush with each other and define machine smooth surfaces. The lower end of each conductor is individually connected to one of two wire leads 184 or 186 which extend through ports 180 and 182, and through aperture 178 to separate connections in the moisture detection control 58 of ice prevention circuit 56. Specifically, one of the wire leads 184 or 186 is connected to resistor 156 and to timer 154, while the other wire lead is connected to the negative return lead from control voltage power supply 42. By means of this connection, timer 154 of moisture detection will detect a voltage signal when the conductors in control 58, insulators 170 and 172 are electrically connected by a conductor such as moisture. Upon detecting voltage, timer 154 will turn on its positive terminal and enable operation of surface temperature controller 60.

In use, snow and moisture sensor 158 is embedded beneath the exterior surface 188 so that the machine smooth surface of the conductors and insulators 170 and 172 are flush with surface 188. Thus, as moisture collects on surface 188, it will eventually create an electrical connection between the conductors in insulators 170 and 172 so as to turn on the output of snow and moisture sensor 158.

Optionally, a thermistor 162 may be affixed within aperture 178 to an interior surface of cross member 174 so as to monitor the temperature of surface 188. Thermistor 162 is connected through a wire lead 190 to the air and surface temperature control 60 of ice prevention circuit 56 for a purpose more fully explained below. The thermistor 162, as well as wire leads 184, 186 and 190, along with any other constituents which may be included in apertures 171, 173 or 178, may be sealed in place within those apertures by use of well-known potting techniques. Such sealing protects against breakage of the leads, supports the materials within the apertures, and comprises a waterproof protectant for snow and moisture sensor 158.

Although sensor 158 may detect the presence of moisture on surface 188, the heating system will not be activated unless temperature conditions are such that ice formation may be possible. Thus, the positive output terminal from timer 154 (FIG. 5) is connected to another identical solid state timer 160 in air and surface temperature control 60. By this means, when moisture is detected on surface 188, air and surface temperature levels are immediately monitored. Heating of surface 188 is initiated only when the formation of ice thereon is possible.

By reference again to FIG. 5 it is seen that, in addition to timer 160, air and surface temperature controller 60 includes a voltage divider circuit comprised of the parallel combination of thermistors 162 and 164, connected in series with resistors 166 and 168. Thermistors 162 and 164 are identical, and thus one may be embedded in the surface to be heated (as illustrated in FIG. 6) and the other may be positioned so as to measure the air temperature in the vicinity of the surface to be heated. Resistors 166 and 168 are sized so that timer 160 will be caused to activate when the electrical signal produced by resistance changes in thermistors 162 and 164 in combination with resistors 166 and 168 corresponds to a temperature which is equal to or less than 33° F. This temperature is actually the average of the measured air and surface temperatures. At average temperatures of 33° F. or less, the positive terminal of timer 160 is turned on so as to connect the heating system to the A.C. power souce and initiate heating within heating element 10.

The positive terminal from timer 160 is connected to the positive terminal of timer 66 (FIG. 3) in synchronous switching system 22, and the negative return from control voltage power supply 42 is connected to the negative input terminal of timer 66 and to capacitor 68 in synchronous switching system 22.

From the foregoing description it will be appreciated that the novel electrical heating system disclosed herein clearly overcomes many of the long standing problems in the art by (1) providing a low voltage heating element which permits essentially uniform heating of adjacent surfaces, while posing essentially no danger of damage resulting from hot spots and essentially no danger of injury to a person contacting the element; (2) providing a novel switching means for connecting the heat system to an A.C. power source without exposing the electrical circuitry or heating system to power surges, voltage spikes, or chatter; (3) providing a means for preventing over heating of transformers in the electrical heating system; (4) providing a unique circuit for monitoring current flow within the heating system and for preventing potential damage as a result of over-current or under-current conditions; (5) providing a means responsive to the presence of moisture and responsive to air and surface temperatures for automatically operating the heating system so as to prevent ice formation on surfaces, and for accomplishing this in an energy efficient and economical manner; and (6) providing an energy efficient electrical heating system which may be easily installed in surfaces such as walls or floors, with very little risk of damage or malfunction resulting from normal handling during installation.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An electrical heating system for use in heating surfaces, said heating system comprising:
   a low voltage heating element positioned substantially parallel to and adjacent the surface to be heated, said heating element comprising a nonferrous, thermally conducting mesh screen, said screen having a mesh density such that the total surface area of the mesh screen is at least substantially equal to the area of that portion of the surface to be heated which is within a perimeter defined by the edges of said screen;
   an alternating current power source; and
   means for connecting the power source to the heating element so as to substantially eliminate transmission of power surges onto the heating system.

2. An electrical heating system as defined in claim 1 wherein the means for connecting the power source to the heating element comprises an electronic circuit interposed between the power source and the heating element, said electronic circuit including means for magnetically charging transformers associated with the heating element and for synchronizing the heating element and transformers with said alternating current power source prior to directly connecting said heating system to said power source.

3. An electrical heating system as defined in claim 1 further comprising means connected to the connecting means for sampling air temperature and for enabling heating system operation in response thereto.

4. An electrical heating system as defined in claim 1 further comprising means for preventing overheating of transformers in said heating system.

5. An electrical heating system as defined in claim 1 further comprising:
   means for monitoring electrical current magnitude within the heating system; and
   means responsive to the monitoring means for preventing operation of the heating system when electrical current magnitude within said heating system exceeds a specified level.

6. An electrical heating system as defined in claim 1 further comprising:
   means for sampling electrical current magnitude within the heating system; and
   means responsive to the sampling means for preventing operation of the heating system when electrical current magnitude within said heating system is below a specified level.

7. An electrical heating system as defined in claim 1 further comprising:
   means for detecting moisture; and
   means responsive to the detecting means for sampling air temperature and surface temperature and for enabling operation of the heating system when said detecting means and said sampling means determine that formation of ice is possible upon the surface to be heated.

8. An electrical heating system for use in heating surfaces, said heating system comprising:
   a low voltage heating element positioned parallel to and adjacent the surface to be heated, said heating element comprising a nonferrous, thermally conducting mesh screen, said screen having a mesh density such that the total surface area of the mesh screen is at least substantially equal to the area of that portion of the surface to be heated, which is within a perimeter defined by the edges of said screen;
   an alternating current power source;
   an electronic circuit interposed between the heating element and the power source for connecting said heating element to said power source so as to substantially eliminate transmission of power surges onto the heating system; and
   means connected to the electronic circuit for sampling air temperature and for enabling said electronic circuit to connect said heating element to said power source in response to changes in the sampled air temperature.

9. An electrical heating system as defined in claim 8 further comprising means for monitoring transformer temerature magnitudes and for preventing operation of said heating system when a transformer temperature exceeds a specified magnitude.

10. An electrical heating system as defined in claim 9 wherein the monitoring means additionally includes means for enabling operation of said heating system when the transformer temperature is below a specified magnitude.

11. An electrical heating system as defined in claim 10 wherein the monitoring means comprises an electronic circuit which includes:
    at least one temperature sensor positioned so as to monitor temperature of at least one transformer in the heating system; and
    a switch means responsive to the temperature sensor for enabling operation of the heating system when the monitored transformer temperature falls below a first specified value and for preventing heating system operation when said monitored temperature is above a second specified value.

12. An electrical heating system as defined in claim 8 wherein said electronic circuit comprises:
    first delay means responsive to enable signals from control elements for delaying connection of the heating element to the power source;
    first means for passing the enable signal from a low voltage direct current portion of the heating system to a high voltage alternating current portion;
    first switch means responsive to the first passing means for permitting power flow from the alternating current power source to the heating element;
    resistive means connected to the first switch means and to the transformer for permitting limited power flow from the power source to the transformer so as to magnetically charge the transformer;
    second delay means responsive to a signal from the first delay means for delaying direct connection of the transformer to the power source;
    second means for passing a signal from the second delay means on a low voltage direct current portion of the heating system to a high voltage alternating current portion; and
    second switch means responsive to the second passing means for permitting direct connection of the transformer to the alternating current power source.

13. An electrical heating system as defined in claim 8 further comprising:
   means for detecting when resistance within the heating element increases; and
   comparitor means responsive to the detecting means for preventing heating system operation when the resistance exceeds a specified value.

14. An electrical heating system as defined in claim 8 further comprising:
   means for detecting when resistance within the heating element decreases; and
   comparitor means responsive to the detecting means for preventing heating system operation when the resistance drops below a specified value.

15. An electrical heating system as defined in claim 8 further comprising:
   means for detecting the presence of moisture near the surface to be heated;
   means responsive to the detecting means for monitoring the temperature of air near the surface to be heated;
   means responsive to the detecting means for monitoring the temperature of the surface to be heated; and
   means responsive to the detecting means, to the means for monitoring the air temperature and to the means for monitoring the temperature of the surface to be heated for enabling heating of said surface.

16. An electrical heating system for use in heating surfaces comprising:
   a heating element comprising a mesh screen constructed of nonferous metal wires and positioned substantially parallel to and adjacent the surface to be heated, said screen having a mesh density such that the total surface area of the wires in said mesh screen is at least substantially equal to the surface area of that portion of said surface which is adjacent said screen within a perimeter defined by the edges of said screen;
   an alternating current power supply;
   first electronic circuit means connected to the power supply and to the heating element for connecting said power supply to said heating element so as to substantially eliminate transmission of power surges, voltage spikes and chattering effects onto the heating system;
   second electronic circuit means connected to the first electronic circuit means for sampling air temperatures and for enabling heating system operation in response thereto;
   third electronic circuit means connected to the first electronic circuit means for monitoring temperatures of transformers in the heating system and for preventing heating system operation when transformer temperatures are above specified values;
   fourth electronic circuit means connected to the first electronic circuit means for monitoring electrical current magnitude within the heating system and for preventing heating system operation when the monitored current magnitude exceeds a specified level; and
   fifth electronic circuit means connected to the first electronic circuit means for monitoring electrical current magnitude within the heating system and for preventing heating system operation when the monitored current magnitude is below a specified level.

17. An electrical heating system as defined in claim 16 wherein the first electronic circuit means comprises:
   means responsive to enable signals from electronic control circuits for magnetically charging transformers associated with the heating element and or synchronizing the heating element, transformers and associated circuitry with the alternating current power supply; and
   means connected to said charging means for preventing direct connection of the transformers to the alternating current power source while said transformers are being magnetically charged and while said transformers, heating element and associated circuitry are being synchronized with said power souce.

18. An electrical heating system as defined in claim 16 further comprising:
   sixth electronic circuit means for detecting the presence of moisture near the structural surface to be heated; and
   seventh electronic circuit means connected to the first electronic circuit means and responsive to the sixth electronic circuit means for monitoring both the temperature of air near the surface to be heated and the temperature of said surface when said sixth electronic circuit means detects moisture, and for enabling heating of said structural surface when formation of ice on said structural surface is possible.

* * * * *

UNITED STATES PATENT AND TRADEMARK OFFICE
CERTIFICATE OF CORRECTION

PATENT NO. : 4,439,666

DATED : March 27, 1984

INVENTOR(S) : Charles H. Graham

It is certified that error appears in the above-identified patent and that said Letters Patent is hereby corrected as shown below:

Column 22, line 24, "element and or" should be --element and for--

Column 22, line 34, "souce" should be --source--

Signed and Sealed this

Sixth Day of November 1984

[SEAL]

Attest:

GERALD J. MOSSINGHOFF

Attesting Officer

Commissioner of Patents and Trademarks